No. 668,302. Patented Feb. 19, 1901.
A. J. WRIGHT.
STEAM TRAP.
(Application filed Dec. 17, 1900.)
(No Model.) 2 Sheets—Sheet 1.
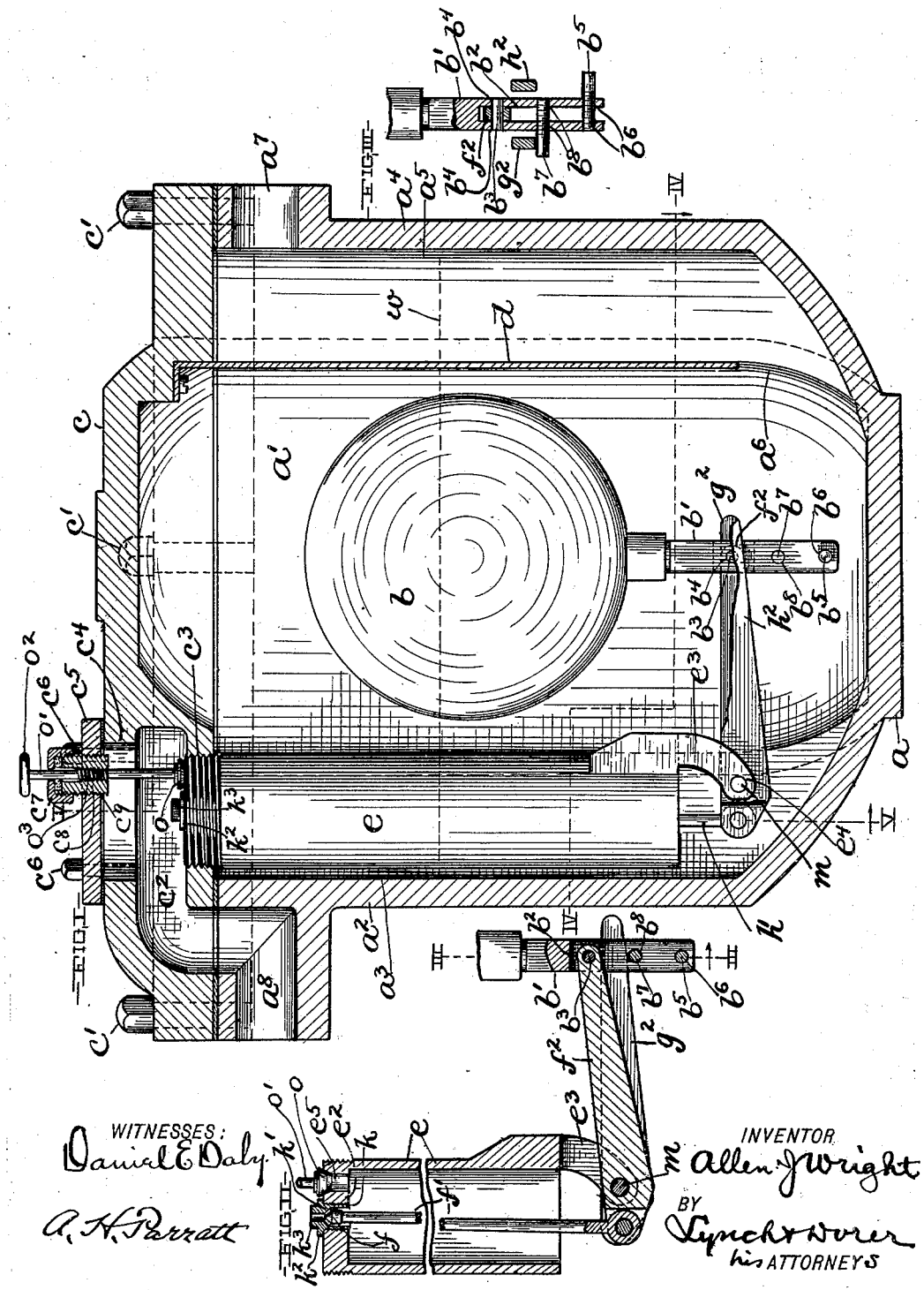
WITNESSES:
Daniel E Daly
A. H. Parratt
INVENTOR
Allen J Wright
BY
Lynch & Morris
his ATTORNEYS
THE NORRIS PETERS CO., PHOTO-LITHO., WASHINGTON, D. C.

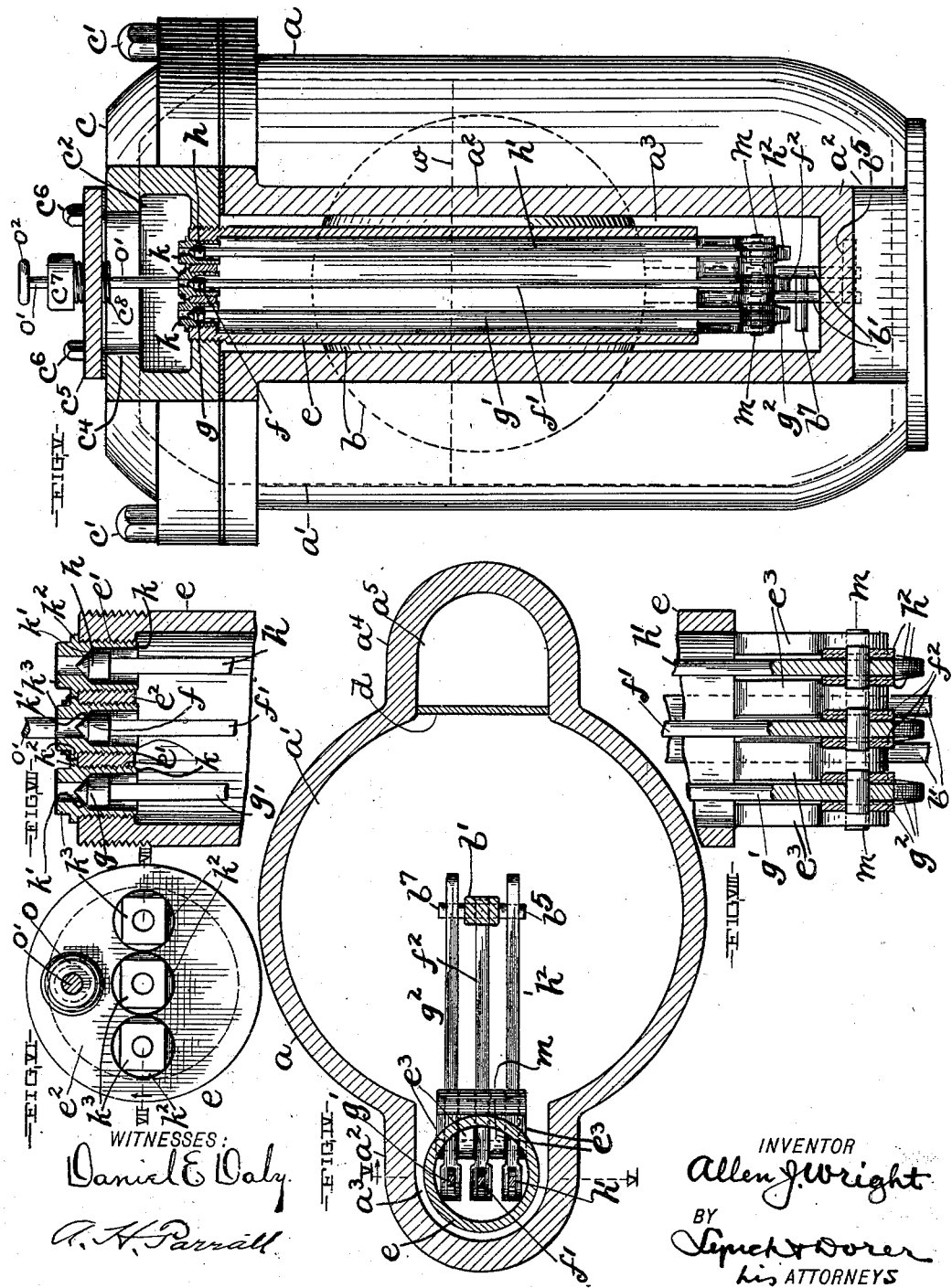

UNITED STATES PATENT OFFICE.

ALLEN J. WRIGHT, OF CLEVELAND, OHIO, ASSIGNOR TO THE WRIGHT MANUFACTURING COMPANY, OF SAME PLACE.

STEAM-TRAP.

SPECIFICATION forming part of Letters Patent No. 668,302, dated February 19, 1901.

Application filed December 17, 1900. Serial No. 40,155. (No model.)

*To all whom it may concern:*

Be it known that I, ALLEN J. WRIGHT, a resident of Cleveland, in the county of Cuyahoga and State of Ohio, have invented certain new and useful Improvements in Steam-Traps; and I do hereby declare the following to be a full, clear, and exact description of the invention, such as will enable others skilled in the art to which it pertains to make and use the same.

My invention relates to improvements in steam-traps.

The primary object of this invention is to produce a trap of the character indicated that is simple and durable in construction, that has great efficiency and capacity in that it is capable of automatically disposing of large quantities of water in emergencies, and that will not waste steam when there is only the normal quantity of water discharged.

With this object in view and to the end of realizing other advantages hereinafter appearing the invention consists in certain features of construction and combinations of parts hereinafter described, and pointed out in the claims.

In the accompanying drawings, Figure I is a side elevation, largely in central vertical section, of a steam-trap embodying my invention. Fig. II is a side elevation, largely in vertical section, of the valve-casing and lever mechanism of the trap and shows the intermediate automatically-operated valve open. Portions are broken away in this figure to reduce the size of the drawings. Fig. III is a vertical section on line III III, Fig. II, looking in the direction indicated by the arrow. Fig. IV is a top plan in section on line IV IV, Fig. I. Fig. V is an elevation, largely in vertical section, on line V V, Figs. I and IV, looking inwardly. Fig. VI is an enlarged top plan of the valve-casing of the trap. Fig. VII is an elevation in section on line VII VII, Fig. VI. Fig. VIII is an enlarged view, partially in section, of the lower end of the valve-casing and the levers supported therefrom.

My improved trap comprises an upright receptacle $a$, which is provided centrally with a float-containing chamber $a'$, and $b$ represents the float within the chamber $a'$ and movable vertically, rising or falling according as the level of the water within the said chamber rises or falls. The chamber $a'$ is closed at the top by a cover $c$, that is removably secured by bolts or screws $c'$ to the upper end of the surrounding wall or walls of the chamber $a'$. The receptacle $a$ is provided with two lateral enlargements $a^2$ and $a^4$, that extend from top to bottom of the receptacle and are arranged, preferably, diametrically opposite each other. The chamber $a^3$ of the enlargement $a^2$ of the receptacle $a$ is in open relation with and forms a lateral enlargement of the chamber $a'$ and contains the vertically-arranged valve-casing $e$, with which the trap is internally provided. The enlargement $a^4$ has its chamber $a^5$ in open relation with the chamber $a'$ only at the bottom of the trap, as at $a^6$, and a vertically-arranged guard-forming partition $d$, which is secured at its upper end to the cover $c$, separates the chamber of the enlargement $a^4$ from the chamber $a'$, except at the bottom of the trap. The passage-way extending through the enlargement $a^4$ of the receptacle $a$ is in open relation at its upper end with the pipe connection or inlet $a^7$, with which the upper end of the receptacle $a$ of the trap is provided.

The cover $c$ extends, of course, over the enlargements $a^2$ and $a^4$ of the receptacle $a$ and is provided above the enlargement $a^2$ with a chamber $c^2$, that is in open relation with the outlet-forming pipe connection $a^8$, with which the receptacle $a$ externally of the upper end of the lateral enlargement $a^2$ is provided. The lower or inner wall of the cover's chamber $c^2$ is provided with a screw-threaded aperture $c^3$, engaged by the correspondingly externally threaded upper end of the valve-casing $e$. The said valve-casing is cylindrical. The valve-casing extends downwardly from the cover $c$ a suitable distance and has the chamber thereof in open relation at the lower end of the casing with the chamber $a^3$ of the lateral enlargement $a^2$ of the receptacle $a$, and the valve-casing's chamber is consequently in open relation at its lower end with the float-containing chamber $a'$.

Communication between the chamber of the valve-casing and the cover's chamber $c^2$ is controlled by a plurality of valves provided within the upper end of the valve-casing. The preferred construction comprises three valves $f$, $g$, and $h$, arranged in a row transversely of the upper end of the valve-casing, and each of the said valves in its closed position engages a downwardly or inwardly facing seat $k'$, formed upon and internally of a port-forming tubular bushing $k$, which has an external annular shoulder $k^2$, is screw-threaded below the said shoulder, and is screwed into a correspondingly-threaded hole $e'$, formed in the head $e^2$, with which the upper or discharging end of the valve-casing is provided. Each bushing $k$ is screwed into the valve-casing head $e^2$ until its external shoulder $k^2$ engages the outer surface of the said head. Each bushing $k$ has an externally-angular portion $k^3$ extending outwardly beyond its shoulder $k^2$ into the chamber $c^2$ of the cover $c$ and accommodating the application of a wrench.

An aperture $c^4$, formed in the top and outer wall of the cover's chamber $c^2$, is normally closed by a cover-forming plate $c^5$, removably secured by bolts or screws $c^6$ to the cover $c$ and affording access to the valve-casing and the valve-containing port-forming bushings $k$.

The valves $f$, $g$, and $h$ have depending stems $f'$, $g'$, and $h'$, respectively, that extend downwardly to and a suitable distance beyond the lower end of the valve-casing. The different valve-stems $f'$, $g'$, and $h'$ are operatively connected at the lower or free end with different vertically-tiltable levers $f^2$, $g^2$, and $h^2$, respectively. Each of the said levers has a short arm and a long arm, has the connected valve-stem attached to its short arm, extends inwardly from the connected valve-stem to the central portion of the float-containing chamber $a'$, and is supported from the valve-casing. The levers $f^2$, $g^2$, and $h^2$ have their axes coincident, and the preferred construction comprises the formation of the fulcrums of the said levers by a single horizontally-arranged pin $m$, that engages registering corresponding horizontally-arranged holes $e^4$, formed in the lower or free ends of the arms or brackets $e^3$, which depend from and are integral with the valve-casing. Four parallel arms or brackets $e^3$ are formed side by side upon the valve-casing. The intermediate lever $f^2$ extends between the two central arms or brackets, and the outer levers $g^2$ and $h^2$ extend between the different central arms or brackets and the different outer arms or brackets, respectively. By this construction the levers are effectually prevented from displacement laterally and the fulcrum-forming pin $m$ has ample bearing. The long arm of each of the aforesaid levers should be sufficiently heavy to somewhat more than counterbalance the short arm of the lever and the valve-stem and valve connected with the lever's short arm, so that normally when there is no water within the receptacle $a$ or when the water-level within the said receptacle is below the float-elevating level the valve connected with the said lever shall be closed.

The construction hereinbefore described, as already indicated, comprises three valve-operating levers arranged side by side within the lower portion of the receptacle $a$ and tiltable vertically. The long arm of the intermediate lever $f^2$ has its free end attached directly to the stem $b'$, depending from and rigid with the float $b$. Preferably the depending stem of the float is slotted vertically and centrally, as at $b^2$, from the lower extremity of the stem upwardly, and the long arm of the lever $f^2$ has its free end engaging the upper or inner end of the slot $b^2$ thus formed, and a pin $b^3$ extends horizontally through the free end of the said lever-arm and engages registering holes $b^4$, made in the side walls of the slot $b^2$ (see Fig. III) and constitutes the means of attaching the said lever-arm to the float-stem. The float-stem between its free extremity and the long arm of the intermediate lever $f^2$ is provided with two laterally-projecting members formed by different pins $b^5$ and $b^7$, respectively, arranged horizontally and projecting beyond opposite sides, respectively, of the float-stem. The pin $b^5$ is located in close proximity to the lower or free end of the float-stem and engages registering holes $b^6$, formed in the side walls of the slot $b^2$ of the said stem. (See Fig. III.) The pin $b^7$ is arranged approximately centrally between the pin $b^5$ and the float-stem-engaging end of the intermediate lever $f^2$ and engages registering holes $b^8$, formed in the side walls of the slot $b^2$ of the float-stem. In the normal position of the parts when there is no water in the trap or when the water-level in the trap is below its float-raising position the three valve-operating levers are parallel, as shown in Figs. I, IV, and V, and the different outer levers $g^2$ and $h^2$ extend into the path of the different projecting members $b^7$ and $b^5$, respectively, of the float-stem in position to be engaged by the said members $b^7$ and $b^5$, respectively, during the upward movement of the float. By the construction hereinbefore described, therefore, the float during its upward movement caused by the rise of water within the trap first operates the intermediate lever $f^2$, and consequently results in the opening of the intermediate valve $f$ against the weight of the long arm of the said lever and the load upon the said arm, and thereby permits the flow of water from the float-containing chamber of the trap to the trap's outlet $a^8$. Figs. II and III illustrate the operation of the intermediate lever $f^2$ and the opening of the intermediate valve $g$, and in this position of the said parts the oppositely-projecting members $b^5$ and $b^7$ of the float-stem $b'$ have moved in the direction of the outer levers, and the member $b^7$ has actually moved into engagement with the long arm of the outer lever $g^2$ and will consequently open the valve $g$, operatively connected with the said lever, during any further elevation of the float, and the other projecting member $b^5$ of the float-stem will come into operative engagement with and thereupon operate the other outer lever $h^2$ and result in the opening of the valve $h$, connected with the last-mentioned lever, when the float has been still farther elevated to the extent required.

The hereinbefore-described construction and arrangement of parts renders the lever mechanism of the trap compact, simple, and reliable in its operation.

Any water coming into the trap at the trap's inlet impinges against guard $d$, formed between the float-containing or main chamber $a'$ of the trap and the lateral enlargement $a^4$ of the trap's casing, and consequently prevents the said water from interfering with the operation of the float and connected mechanism.

Briefly described, the operation of my improved steam-trap is as follows: The trap is connected at its water-inlet $a^7$ with the heating system, dry-kiln, separator, or whatever it is desired to drain the water from. Water and steam enter at the said inlet and pass down the chamber or passage-way formed in the lateral enlargement $a^4$ of the trap into the lower end of the float-containing chamber below the float and lever mechanism, and the valves remain closed until enough water accumulates within the said chamber to lift the float to the extent required to operate the intermediate lever $f^2$ and the connected intermediate valve $f$, when water will flow from within the valve-casing to the outlet $a^8$ of the trap. If the capacity of the discharge of water afforded by the opening of the port controlled by said intermediate valve is insufficient to discharge the quantity of water coming into the trap, the level of water within the trap rises still farther and results in a further elevation of the float, which when lifted far enough operates the outer lever $g^2$, and thereby opens the outer valve $g$, and thus increases the discharge from the valve-casing to the trap's outlet, and if the aggregate capacity of the discharge afforded by the opening of the two valves already opened is still insufficient to discharge the quantity of water coming into the trap the level of the water will rise still farther within the trap and result in a further elevation of the float, which when raised sufficiently will result in the operation of the remaining outer lever $h^2$, and thereby open the remaining valve $h$.

By the construction hereinbefore described the entire internal mechanism of the trap, including the guard $d$, the valve-casing $e$, the float, and the valve-operating levers, is supported from the cover $e$, so that all of the said mechanism is removable simultaneously with the cover from the receptacle $a$ of the trap.

The dotted horizontal line $w$ in Figs. I and III indicates the water-level preparatory to the commencement of the operation of the intermediate lever $f^2$.

To accommodate an extraordinary discharge of water from the trap, a discharge not accommodated by the opening of the three valves $f$, $g$, and $h$, I have provided a hand-operated valve $o$, that normally closes a port $e^5$, (see Fig. II,) formed in the head $e^2$ of the valve-casing $e$ and instrumental in connecting the chamber of the valve with the outlet $a^8$ of the trap. The valve $o$ has a stem $o'$, that extends through a stuffing-box $c^7$, with which the plate or cover $c^5$ is provided, and terminates outside of the said cover $c^5$ in a hand-wheel $o^2$. The valve-stem $o'$ has an externally-screw-threaded portion $o^3$, as shown in Fig. I, that engages a correspondingly-threaded bore formed in an externally-screw-threaded plug $c^8$, which participates in the formation of the stuffing-box $c^7$ and is screwed into a correspondingly-threaded hole $c^9$, formed in the cover $c^5$. Obviously the valve $o$ is opened by turning the stem of the valve in the direction required to withdraw the valve from the valve-casing. It will be observed, therefore, that all of the internal mechanism of the trap, including the valve $o$, is borne by and removable with the main cover $c$ of the trap. I would remark also that the peculiar external configuration of the trap is not unimportant, because it is instrumental in the production of a trap that is comparatively light and less expensive, and, for instance, the enlargement $a^4$ of the trap and the location of the guard $d$ at the inner side of the said enlargement enables the use of an ordinary straight and comparatively narrow piece for the formation of the said guard, reducing the amount of material required in making the said guard to a minimum, rendering the guard light, and requiring no special and expensive design or workmanship in the provision and application of the said guard.

What I claim is—

1. A steam-trap of the character indicated, comprising a closed receptacle having an inlet and an outlet; a valve-casing having its chamber in open relation with the chamber of the receptacle, which valve-casing is arranged within one side of the receptacle and has a plurality of ports instrumental in connecting the chamber of the valve-casing with the aforesaid outlet; valves normally closing the different ports, respectively, and provided, respectively, with a stem; as many levers as there are valve-stems, which levers have, respectively, a short arm and a long arm, with the short arms of the different levers attached to the different valve-stems, respectively, and means whereby power is applied, first, to the long arm of one of the said levers when a predetermined level of water occurred within the trap and, subsequently, to the long arm of the remaining lever or levers when the water-level within the trap rises farther a predetermined extent, substantially as and for the purpose set forth.

2. A steam-trap of the character indicated, comprising a closed receptacle having an inlet and an outlet; a valve-casing having its chamber in open relation with the chamber of the receptacle, which valve-casing is arranged within one side of the receptacle and has a plurality of ports instrumental in connecting the chamber of the valve-casing with the aforesaid outlet; valves normally closing the different ports, respectively, and provided, respectively, with a stem; as many levers as there are valve-stems, which levers have, respectively, a short arm and a long arm, with the short arms of the different levers attached to the different valve-stems, respectively; a float contained within the trap and having a range of movement up and down, which float is attached to the long arm of one of the aforesaid levers and will operate the said lever to open the connected valve when the float is elevated by water accumulating in the trap, and means whereby power is applied to the long arms of the remaining levers when the float has been farther elevated a predetermined extent, substantially as and for the purpose set forth.

3. A steam-trap of the character indicated, comprising a covered receptacle having an inlet and an outlet; a valve-casing arranged within one side of the receptacle and depending from and rigid with the cover of the receptacle, which valve-casing has its chamber at the lower end in open relation with the chamber of the receptacle and has its upper end provided with a plurality of ports instrumental in connecting the chamber of the valve-casing with the aforesaid outlet; valves normally closing the different ports, respectively, and arranged to move downwardly to open and provided, respectively, with a depending stem; as many levers as there are valve-stems, which levers have, respectively, a short arm and a long arm, with the short arms of the different levers attached to the different valve-stems, respectively, and means whereby power is applied, first, to the long arm of one of the said levers when a predetermined level of water occurs within the trap and, subsequently, to the long arm of the remaining lever or levers when the water-level within the trap rises farther a predetermined extent, substantially as and for the purpose set forth.

4. A steam-trap of the character indicated, comprising a covered receptacle having an inlet and an outlet; a valve-casing arranged within one side of the receptacle and depending from and rigid with the cover of the receptacle, which valve-casing has its chamber at the lower end in open relation with the chamber of the receptacle and has its upper end provided with a plurality of ports instrumental in connecting the chamber of the valve-casing with the aforesaid outlet; valves normally closing the different ports, respectively, and arranged to move downwardly to open and provided, respectively, with a depending stem extending downwardly to and below the lower end of the valve-casing; arms or brackets formed upon and depending from the lower end of the valve-casing between the valve-stems and the central portion of the trap; as many levers as there are valve-stems, which levers are fulcrumed to the aforesaid brackets or arms and have, respectively, a short arm and a long arm, with the short arms of the different levers attached to the different valve-stems, respectively, and means whereby power is applied, first, to the long arm of one of the said levers when a predetermined level of water occurs within the trap and, subsequently, to the long arm of the remaining lever or levers when the water-level within the trap rises farther a predetermined extent, substantially as and for the purpose set forth.

5. A steam-trap of the character indicated, comprising a closed receptacle having an inlet and an outlet; a valve-casing having its chamber in open relation with the chamber of the receptacle and arranged within the receptacle and provided with three ports instrumental in connecting the chamber of the valve-casing with the aforesaid outlet; three valves normally closing the different ports, respectively, and provided, respectively, with an upright stem; three tiltable levers arranged side by side and operatively connected, at one end, with the different valve-stems, respectively, and means whereby power is applied, first, to the long arm of one of the said levers when a predetermined level of water occurs within the trap, and, subsequently, and successively, to the remaining levers when the water-level within the trap rises farther a predetermined extent, substantially as and for the purpose set forth.

6. A steam-trap of the character indicated, comprising a closed receptacle having an inlet and an outlet; a valve-casing arranged vertically within one side of the receptacle and having its chamber in open relation at one end with the chamber of the receptacle, which valve-casing has its opposite end provided with a plurality of ports instrumental in connecting the chamber of the valve-casing with the outlet of the trap; as many valves as there are ports, which valves normally close the different ports, respectively, and have, respectively, a stem extending to the first-mentioned end of the valve-casing; as many vertically-tiltable levers as there are valves, which levers are arranged side by side and supported from the valve-casing and operatively connected with the different valve-stems, respectively, and means whereby the levers are operated successively when the water rises within the trap so that the valves will be opened successively, substantially as and for the purpose set forth.

7. A steam-trap of the character indicated, comprising a closed receptacle having an inlet and an outlet; an upright valve-casing arranged within the receptacle and having its chamber, at one end of the valve-casing, open and connecting with the chamber of the receptacle, which valve-casing has its opposite end provided with a head having a plurality of ports instrumental in connecting the valve-casing's chamber with the outlet of the trap; as many valves as there are ports, which valves normally close the different ports, respectively, and have, respectively, a stem extending within and longitudinally of the valve-casing to and beyond the open end of the valve-casing; arms or brackets formed upon the valve-casing adjacent to the valve-stems; a horizontally-arranged pin having bearing in the said arms or brackets; as many vertically-tiltable levers as there are valves, which levers are loosely mounted or fulcrumed upon the said pin and arranged side by side and operatively connected to the different valve-stems, respectively, and means whereby the levers are operated successively to open the connected valves successively during the rising of the water accumulating within the trap, substantially as and for the purpose set forth.

8. A steam-trap of the character indicated, comprising a closed receptacle having an inlet and an outlet; a float arranged within the chamber of the receptacle and having a stem arranged up and down; an upright valve-casing arranged within the receptacle and having its chamber in open relation with the float-containing chamber; a plurality of ports formed in the valve-casing and instrumental in connecting the valve-casing's chamber with the outlet of the trap; as many valves as there are ports, which valves normally close the different ports, respectively, and are each provided with a stem; as many vertically-tiltable levers as there are valves, which levers are operatively connected with the different valve-stems, respectively, and means whereby the levers are successively operated by the float-stem so as to open the valves successively during the rising of the float within the trap, substantially as and for the purpose set forth.

9. A steam-trap of the character indicated, comprising a closed receptacle having an inlet and an outlet; a float within the chamber of the receptacle and having a stem arranged up and down; three ports instrumental in establishing open relation between the float-containing chamber and the outlet of the trap; three valves normally closing the different ports, respectively; a vertically-tiltable lever operatively connected with one of the valves and operatively connected with the float-stem; two members formed upon the float-stem at different elevations, respectively, below the connection of the aforesaid lever to the said stem, and two other levers operatively connected with the different remaining levers, respectively, and arranged to be successively engaged by the different aforesaid members, respectively, of the float-stem during the rising of the float after the operation of the first-mentioned lever, substantially as and for the purpose set forth.

10. A steam-trap of the character indicated, comprising a closed receptacle having an inlet and an outlet; a float arranged within the chamber of the receptacle and having a stem arranged up and down; three ports instrumental in establishing open relation between the float-containing chamber and the outlet of the trap; three valves normally closing the different ports, respectively; three vertically-tiltable levers operatively connected with the different valves, respectively; an operative connection between one of the said levers and the float-stem, and two members formed upon and projecting laterally of opposite sides, respectively, of the float-stem and arranged to successively engage and thereupon operate the different remaining levers, respectively, during the elevation of the float after the operation of the first-mentioned lever, substantially as and for the purpose set forth.

11. A steam-trap of the character indicated, comprising a closed receptacle having an inlet and an outlet; a valve-casing arranged within one side of the receptacle, which casing is open at its lower end and has its upper end provided with three ports instrumental in connecting the chamber of the valve-casing with the aforesaid outlet; three valves normally closing the different ports, respectively, and arranged to move downwardly in opening, and provided, respectively, with a depending stem extending downwardly to and beyond the lower end of the valve-casing; a float contained within the trap and having a depending stem; two members formed upon and projecting laterally of opposite sides of the said float-stem at different elevations, respectively; three vertically-tiltable levers arranged side by side and operatively connected with the different valve-stems, respectively; an operative connection between one of the said levers and the float-stem, and the two remaining levers extending into the path of the different projecting members, respectively, of the float-stem, substantially as and for the purpose set forth.

12. A steam-trap of the character indicated, comprising a covered receptacle having an outlet and an inlet, which receptacle is enlarged laterally, as at $a^2$, and has the enlargement thus formed extending from the upper end to the lower end of the receptacle; a valve-casing arranged within the said enlargement of the receptacle and depending from and rigid with the cover of the receptacle, which valve-casing is in open relation with the chamber of the receptacle and has its upper end provided with a plurality of ports instrumental in connecting the chamber of the valve-casing with the trap's outlet; valves normally closing the different ports, respectively, and arranged to move downwardly to open, and provided, respectively, with a depending stem; as many vertically-tiltable levers as there are valve-stems, which levers extend into the aforesaid enlargement and are there operatively connected with the different valve-stems, respectively, and means whereby the levers are operated successively when the water rises within the trap so that the valves will be opened successively, substantially as and for the purpose set forth.

13. A steam-trap of the character indicated, comprising a closed receptacle having an inlet and an outlet, which receptacle is enlarged laterally, as at $a^4$, and has the enlargement thus formed extending from the upper end to the lower end of the receptacle; a float arranged within the chamber of the receptacle; a valve-casing arranged within the receptacle and having its chamber in open relation with the float-containing chamber; a plurality of ports formed in the valve-casing and instrumental in connecting the valve-casing's chamber with the outlet of the trap; as many valves as there are ports, which valves normally close the different ports, respectively; mechanism whereby the valves are opened successively by and during the rising of the float, and a guard forming the inner side wall of the chamber or passage-way formed in the aforesaid enlargement and extending from the upper end of the said enlargement downwardly to near the lower end of the said passage-way, substantially as and for the purpose set forth.

14. A steam-trap of the character indicated, comprising a covered receptacle having an outlet and an inlet, a valve-casing rigid with and depending from the cover of the receptacle, which casing has its chamber in open relation at the lower end with the chamber of the receptacle, and has its upper end provided with a head having several ports instrumental in connecting the chamber of the valve-casing with the aforesaid outlet; several valves normally closing the different ports, respectively, means whereby all of the said valves, save one, are caused to open successively by and during the rising of the level of water within the trap, and means for manually operating the aforesaid excepted valve, substantially as and for the purpose set forth.

15. A steam-trap of the character indicated, comprising a receptacle $a$ having an inlet and an outlet, which receptacle is enlarged laterally, as at $a^2$, and has the enlargement thus formed extending from the upper end to the lower end of the receptacle; a cover $c$ removably secured to and closing the receptacle at the top; a valve-casing arranged within the aforesaid enlargement of the receptacle and depending from and rigid with the cover, which valve-casing is in open relation with the chamber of the receptacle and has its upper end provided with several ports instrumental in connecting the chamber of the valve-casing with the valve's outlet; several valves normally closing the different ports, respectively; mechanism whereby all of the valves, save one, are successively opened by and during the rising of the level of water within the trap; an aperture $c^4$ formed within the aforesaid cover in line with the valve-casing; a cover-forming plate $c^5$ closing the said aperture; means for manually operating the aforesaid excepted valve and comprising a stem extending from the valve through the cover-forming plate, and a stuffing-box formed upon the said plate around the said stem, substantially as shown, for the purpose specified.

Signed by me at Cleveland, Ohio, this 8th day of December, 1900.

ALLEN J. WRIGHT.

Witnesses:
C. H. DORER,
A. H. PARRATT.